(12) United States Patent
Kuo et al.

(10) Patent No.: US 12,335,588 B2
(45) Date of Patent: Jun. 17, 2025

(54) VOICE COIL MOTOR, CAMERA MODULE, AND ELECTRONIC DEVICE

(71) Applicant: HUAWEI TECHNOLOGIES CO., LTD., Guangdong (CN)

(72) Inventors: Li-Te Kuo, Dongguan (CN); Quanming Lv, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 18/158,602

(22) Filed: Jan. 24, 2023

(65) Prior Publication Data

US 2023/0164409 A1    May 25, 2023

Related U.S. Application Data

(63) Continuation of application No. PCT/CN2021/107096, filed on Jul. 19, 2021.

(30) Foreign Application Priority Data

Jul. 27, 2020    (CN) .......................... 202010730827.3

(51) Int. Cl.
*H04N 23/54*    (2023.01)
*H04N 23/50*    (2023.01)
(Continued)

(52) U.S. Cl.
CPC .............. *H04N 23/54* (2023.01); *H04N 23/55* (2023.01); *H04N 23/57* (2023.01)

(58) Field of Classification Search
CPC ........ H04N 23/54; H04N 23/55; H04N 23/57; H04N 17/02; H04N 23/125; H04N 23/23;
(Continued)

(56) References Cited

U.S. PATENT DOCUMENTS

| 7,580,621 B2 | 8/2009 | Nomura et al. |
| 8,736,139 B2 | 5/2014 | Lee |

(Continued)

FOREIGN PATENT DOCUMENTS

| CN | 1763625 A | 4/2006 |
| CN | 106993127 A | 7/2017 |

(Continued)

OTHER PUBLICATIONS

Chang-Lin Hsieh, Chien-Sheng Liu, "Design of a Voice Coil Motor Actuator With L-Shape Coils for Optical Zooming Smartphone Cameras", IEEE Access (vol. 8), Jan. 19, 2020, total 8 pages.

(Continued)

*Primary Examiner* — Ahmed A Berhan

(57) ABSTRACT

A voice coil motor, a camera module, and an electronic device. The voice coil motor includes a motor housing, and a fixed assembly and a moving assembly that are disposed in the motor housing. The fixed assembly and the moving assembly are sequentially disposed in a direction from a light incident side to a backlight side at an interval. The moving assembly is connected to the fixed assembly by using suspension wires. The fixed assembly includes an annular fastening part and a magnetic element. The moving assembly includes an annular circuit board and a flexible mechanism. A coil group is disposed on one side that is of the annular circuit board and that is close to the annular fastening part. One side that is of the moving assembly and that faces the backlight side is configured to connect to an image sensor circuit board.

20 Claims, 9 Drawing Sheets

(51) Int. Cl.
*H04N 23/55* (2023.01)
*H04N 23/57* (2023.01)

(58) Field of Classification Search
CPC ...... H04N 23/52; H04N 23/50; H02K 41/035; H02K 41/0354
See application file for complete search history.

(56) References Cited

U.S. PATENT DOCUMENTS

| | | |
|---|---|---|
| 2006/0092514 A1 | 5/2006 | Koo et al. |
| 2008/0252774 A1 | 10/2008 | Chen et al. |
| 2013/0021485 A1 | 1/2013 | Hsu |
| 2017/0289457 A1 | 10/2017 | Hu et al. |
| 2019/0246490 A1* | 8/2019 | Li .................. H04N 23/55 |
| 2021/0084202 A1* | 3/2021 | Xuepeng .......... H04N 23/687 |
| 2022/0247931 A1* | 8/2022 | Mahmoudzadeh .................. H02K 41/0356 |

FOREIGN PATENT DOCUMENTS

| | | |
|---|---|---|
| CN | 107948532 A | 4/2018 |
| CN | 111045278 A | 4/2020 |
| CN | 210327773 U | 4/2020 |
| JP | 2003204470 A | 7/2003 |
| JP | 2006031027 A | 2/2006 |
| JP | 2014081504 A | 5/2014 |
| JP | 2017003933 A | 1/2017 |
| KR | 10-2010-0103297 A | 9/2010 |
| KR | 10-2015-0042681 A | 4/2015 |
| KR | 10-2019-0091573 A | 8/2019 |
| WO | 2018044625 A1 | 3/2018 |
| WO | 2018112436 A1 | 6/2018 |

OTHER PUBLICATIONS

Indian Office Action with translation issued in Application No. 202317012726 dated Aug. 22, 2024.
Korean Office Action issued in Korean Application No. 10-2023-7005625 dated Nov. 21, 2024.
Ching-Chang Chen, An Optical Image Stabilization Using Novel Ultrasonic Linear Motor and Fuzzy Sliding-Mode Controller for Portable Digital Camcorders, IEEE Transactions on Consumer Electronics ( vol. 63, Issue: 4, Nov. 2017), total 7 pages.
Faez Saleh Ahmed Ba Tis, Three-Degrees-Of-Freedom MEMs Electrostatic Out-Of-Plane Comb-Drive Actuator for Auto-Focus and Image Stabilization in Phone Cameras, Mechanical and Industrial Engineering, Jun. 2014, total 93 pages.
Hiroshi Ezawa, Development of Mirrorless Interchangeable Lens Digital Cameras OM-D E-M5(Development of 5-Axis In-Body Image Stabilization System), Olympus Corporation, Corporate RandD Center, Imaging Technology RandD Division, Imaging System Development Department 1, May 15, 2013, total 4 pages, with English abstract.
Chinese Office Action issued in Chinese Application No. 202010730827.3 dated Apr. 3, 2024.
Japanese Office Action with English translation issued in Japanese Application No. 2023-505694 dated Nov. 28, 2023.
European Office Action issued in EP Application No. 21 851 172.3 dated Oct. 4, 2024.

* cited by examiner

VOICE COIL MOTOR, CAMERA MODULE, AND ELECTRONIC DEVICE

CROSS-REFERENCE TO RELATED APPLICATIONS

This application is a continuation of International Application PCT/CN2021/107096, filed on Jul. 19, 2021, which claims priority to Chinese Patent Application No. 202010730827.3, filed on Jul. 27, 2020. The disclosures of the aforementioned applications are hereby incorporated by reference in their entireties.

TECHNICAL FIELD

This application relates to the field of camera devices, and in particular, to a voice coil motor, a camera module, and an electronic device.

BACKGROUND

As requirements of consumers for shooting quality of electronic devices such as a mobile phone are continuously improved, more manufacturers are committed to improving image stabilization effects of apparatuses such as the electronic devices.

Currently, in a commercialized camera module with optical image stabilization, an image sensor is usually integrated on a movable platform of a voice coil motor (VCM) to reduce an overall volume of the camera module. However, an existing movable platform is usually connected to a deformable frame. In addition, a coil is mounted on the frame to form a moving assembly of a VCM, and then a fixed assembly (for example, an element such as a magnet) of the VCM is assembled in the frame. When a camera module of this structure is prepared, a sensor assembly needs to be prefabricated in a frame structure of the moving assembly in advance. However, when the sensor assembly and a motor component are produced by different manufacturers, function verification cannot be independently performed on each module. Consequently, a delivery interface is not decoupled. Components of different manufacturers need to be simultaneously delivered, which is not conducive to management and control of delivery quality. In addition, the sensor assembly and the motor component need to be simultaneously assembled during preparation, which is prone to causing a decrease in an overall yield. In addition, because an unqualified product is difficult to be disassembled, discard costs of a defective product are greatly increased.

SUMMARY

This application provides a voice coil motor used in a camera module, a camera module, and an electronic device, so that function verification can be independently performed on a sensor assembly and a motor component, thereby improving an overall assembly yield of the camera module and reducing discard costs of a defective product.

According to a first aspect, this application provides a voice coil motor. The voice coil motor may be used in a camera module. The camera module includes the voice coil motor and an image sensor assembly, and the image sensor assembly includes an image sensor circuit board and an image sensor disposed on the image sensor circuit board. The voice coil motor includes a motor housing, and a fixed assembly and a moving assembly that are disposed in the motor housing. The motor housing has a light incident side and a backlight side, and an incident hole is provided on the light incident side. The fixed assembly and the moving assembly are sequentially disposed in a direction from the light incident side to the backlight side at an interval, and the moving assembly is connected to the fixed assembly by using suspension wires. The fixed assembly includes an annular fastening part, and a magnetic element is disposed on one side that is of the annular fastening part and that is close to the moving assembly. The moving assembly includes an annular circuit board, the annular circuit board is configured to connect to an external circuit by using a flexible mechanism, a coil group is disposed on one side that is of the annular circuit board and that is close to the annular fastening part, and an acting force generated between the coil group and the magnetic element after the coil group is energized drives the annular circuit board to move. One side that is of the moving assembly and that faces the backlight side is configured to connect to the image sensor circuit board, so that when the moving assembly operates, the image sensor assembly is driven to move.

In the voice coil motor, the fixed assembly and the moving assembly are stacked in the direction from the light incident side to the backlight side, that is, in an optical axis direction, and are disposed at an interval. The fixed assembly and the moving assembly are sequentially disposed, and a specific gap exists between the fixed assembly and the moving assembly. In this way, the fixed assembly and the moving assembly can be independently disposed. The fixed assembly and the moving assembly are connected by using the suspension wires. One end of the suspension wire is connected to the fixed assembly, and the other end of the suspension wire is connected to the moving assembly. When the coil group is energized, the magnetic element and the coil group interact with each other to generate the acting force that drives the annular circuit board to move. For example, the annular circuit board may be enabled to move in the optical axis direction, or may be translated or rotated in a plane perpendicular to an optical axis. The annular circuit board is connected to the flexible mechanism. In this way, the flexible mechanism moves with the annular circuit board. The side that is of the moving assembly and that faces the backlight side is configured to connect to the image sensor circuit board. When the camera module is assembled, the image sensor circuit board may be connected to the moving assembly, so that when the moving assembly operates, the image sensor assembly is driven to move. Therefore, when the camera module is assembled by using the voice coil motor, independent production and free assembly of the image sensor assembly and a motor component can be implemented. When the image sensor assembly and the motor component are produced by different manufacturers, function verification can be independently performed on each component. This is more conducive to management and control of delivery quality and improvement of an overall yield of the camera module.

In a possible embodiment of this application, the voice coil motor further includes a cover plate, and the cover plate is located on the backlight side of the motor housing. Before the camera module is assembled by using the voice coil motor in this embodiment of this application, function verification may be separately performed on the motor component and the image sensor assembly first, then the image sensor assembly is mounted on the annular circuit board, and then the cover plate is covered. The cover plate is disposed to prevent a pollutant from entering the motor housing.

In a possible implementation of this application, a first through hole is provided on the annular fastening part of the fixed assembly. When the camera module is assembled, the first through hole is configured to assemble a lens assembly. In a possible implementation of this application, when the annular circuit board is specifically disposed, a second through hole is provided on the annular circuit board, and the second through hole may be configured to assemble the image sensor assembly.

In a possible implementation of this application, a connection part is disposed on the side that is of the moving assembly and that faces the backlight side, the connection part is configured to connect to the image sensor circuit board, and the connection part includes a pad and/or a conductive plug connector. A mechanical connection and an electrical connection between the moving assembly and the image sensor circuit board can be simultaneously implemented by using the pad or conductive plug connector as the connection part.

In a possible implementation of this application, the connection part may be disposed on a surface of one side that is of the annular circuit board and that is close to the backlight side. When the camera module is assembled, the image sensor assembly can be fastened to the annular circuit board by using the connection part. In this connection manner, an electrical signal of the image sensor assembly can be transmitted to the flexible mechanism by using the annular circuit board, and then transmitted outward by using the flexible mechanism.

In a possible implementation of this application, circuit wiring may be disposed on the flexible mechanism, and the annular circuit board and the image sensor assembly are connected to the external circuit by using the flexible mechanism, to implement electrical control on the coils on the annular circuit board and electrical control on the image sensor. The flexible mechanism is, for example, a flexible printed circuit, and is configured to implement a connection between the annular circuit board and the external circuit. The flexible mechanism is disposed to connect the annular circuit board and the external circuit, and play a specific role of mechanical support for the annular circuit board. In addition, when the annular circuit board moves, movement of the annular circuit board is not hindered.

In an optional implementation solution of this application, the connection part is disposed on a surface that is of a flexible substrate and that faces the backlight side. When the image sensor assembly is fastened, the image sensor assembly may be fixedly connected to the flexible substrate by using the connection part. In this connection manner, an electrical signal of the image sensor assembly can be directly transmitted outward by using the flexible mechanism.

In an optional implementation solution of this application, when the flexible mechanism is specifically disposed, the flexible mechanism may include a flexible substrate and flexible arms connected to the flexible substrate. The flexible substrate is attached to a surface that is of the annular circuit board and that is close to the backlight side, and a free end of the flexible arm is connected to the annular fastening part or the motor housing. When an electrical connection interface connected to the external circuit is disposed on the annular fastening part, the free end of the flexible arm may be connected to the annular fastening part. When the electrical connection interface connected to the external circuit is disposed on the motor housing, the free end of the flexible arm may be connected to the motor housing. Circuit wiring is disposed on both the flexible substrate and the flexible arms, to implement an electrical connection. In addition to implementing the electrical connection, the flexible mechanism may further limit the annular circuit board to a specific movement range.

In addition, in an optional implementation solution of this application, when the flexible mechanism is specifically disposed, a thermally conductive layer may be further disposed on each of a surface of one side that is of the flexible substrate and that is away from the annular circuit board and surfaces of the flexible arms, to improve a heat dissipation capability of the flexible mechanism. A coefficient of thermal conductivity of the thermally conductive layer should be as high as possible, so that heat generated in an operation process of the annular circuit board and the flexible mechanism can be dissipated as soon as possible. The thermally conductive layer may be but is not limited to a graphene thermally conductive layer, a graphite thermally conductive layer, a copper layer, or a silver layer. Because graphene has a high coefficient of thermal conductivity, the heat dissipation capability of the flexible mechanism can be further improved by using graphene as a material of the thermally conductive layer.

In an optional implementation solution of this application, when the suspension wires are specifically disposed, there may be a plurality of suspension wires, where "a plurality of" refers to not less than two, for example, a quantity of suspension wires is three, four, five, or more. When the suspension wires are connected to the annular circuit board, the plurality of suspension wires may be scattered in a circumferential direction of the annular circuit board, to improve stability of the annular circuit board in a movement process.

After the suspension wires are suspended, and when the magnetic element and the coils do not generate an interaction force, a surface of one side that is of the annular circuit board and that faces the annular fastening part and a surface of one side that is of the annular fastening part and that faces the annular circuit board may be in a relatively parallel position state. When an outline of the annular circuit board is circular, the plurality of suspension wires may be evenly arranged in the circumferential direction of the annular circuit board. When the outline of the annular circuit board is not circular, for example, when the outline of the annular circuit board is a symmetric shape, the plurality of suspension wires may be symmetrically connected to the annular circuit board.

The quantity of suspension wires may be selected based on a geometric form of the moving assembly, so that a force on the moving assembly is more uniform and stable. For example, three or more suspension wires are disposed, so that it can be ensured that the moving assembly is in a stable state, and unnecessary shaking is reduced. In addition, a length and a diameter of the suspension wire, suspension positions of the suspension wire in the moving assembly and the fixed assembly, and the like may be further determined based on a thrust force required by a driven load (namely, the moving assembly) through simulated analysis.

In a possible implementation of this application, when the suspension wire is connected, one end that is of the suspension wire and that is connected to the fixed assembly may be directly connected to the annular fastening part. In addition, to further increase a movement distance or rotation angle of the suspension wire, in an optional implementation solution of this application, an elastic element may be disposed on one side that is of the annular fastening part and that is away from the moving assembly, one end of the suspension wire is connected to the elastic element, and the other end of the suspension wire is connected to the annular circuit board. The elastic element is disposed to effectively increase the movement distance or rotation angle of the suspension wire. In addition, the suspension wires may be used to drive the moving assembly to return to an initial position.

In an optional implementation solution of this application, when the annular circuit board is specifically disposed, an outline structure of the annular circuit board may be a symmetric structure, for example, an equilateral triangle, a rectangle, a square, an equilateral pentagon, or an equilateral hexagon. An annular structure is disposed as a symmetric shape to improve a force condition of the annular circuit board. When the magnetic element and the coil group interact with each other, the force on the annular circuit board can be effectively balanced, and movement stability of the annular circuit board can be improved. In addition, when the annular circuit board is an equilateral triangle, a rectangle, a square, an equilateral pentagon, or an equilateral hexagon, a shape of the annular fastening part and a shape of the elastic element each may also be correspondingly set to an equilateral triangle, a rectangle, a square, an equilateral pentagon, or an equilateral hexagon. In this case, the quantity of suspension wires may be set to three, four, five, six, or the like.

In an optional implementation solution of this application, the coil group may include a plurality of coils. The annular circuit board is of a homocentric square structure. The annular circuit board of the homocentric square structure has four side edges, and a plurality of coils may be disposed on each side edge or a plurality of coils may be disposed on two of the side edges. The annular circuit board of the homocentric square structure is disposed to separately control a force on each side edge of the annular circuit board, so that the annular circuit board performs multi-angle and multi-direction movement. In an optional specific implementation, two coils are disposed on each side edge. Translation movement and rotation movement of the image sensor assembly may be implemented by changing energization directions of different coils, thereby implementing a five-axis image stabilization function of the camera module. In addition, when the coils are specifically disposed, a coil group quantity, a thickness, a width, a winding length, a winding layer quantity, an impedance, a coil placement position on the annular circuit board, and the like may be determined based on a thrust force required by a driven load (namely, the moving assembly) through simulated analysis.

In an optional implementation solution of this application, when the magnetic element is specifically disposed, the magnetic element may be disposed as a plurality of magnet blocks. The plurality of magnet blocks are disposed on a surface of the annular fastening part in a circumferential direction, to enclose a closed annular structure. Alternatively, the plurality of magnet blocks may be disposed on the surface of the annular fastening part at intervals. In addition, the magnetic element may alternatively be disposed as an annular magnet surrounding an end part of the annular fastening part, and the annular magnet may be of an integrated structure. The magnetic element is disposed as the annular magnet, so that a magnetic field in which each coil in the coil group is located is more uniform and consistent. In this way, disposition positions of the coils may be more flexible, thereby avoiding a large difference that is between forces on the coils and that is caused by a different disposition position of the magnetic element. Similarly, when the magnetic element is specifically disposed, a magnet quantity, a magnet model, a magnet volume, a magnet placement position on the annular fastening part, and the like may be determined based on a thrust force required by a driven load (namely, the moving assembly) through simulated analysis.

According to a second aspect, this application further provides a camera module. The camera module may be used in an electronic device that has a shooting function. The camera module may include a lens assembly, an image sensor assembly, and the voice coil motor according to the first aspect of this application. The lens assembly is disposed in the first through hole of the annular fastening part. The image sensor assembly is fixedly connected to the moving assembly, and blocks the second through hole of the annular circuit board, to obtain light that passes through the lens assembly.

In the camera module of this structure, when the image sensor assembly and the motor component are produced by different manufacturers, function verification can be independently performed on each component, and product delivery can be independently performed. This is more conducive to management and control of delivery quality and improvement of an overall yield of the camera module.

In an optional implementation solution of this application, when the image sensor assembly is specifically disposed, the image sensor assembly includes an image sensor circuit board, and an image sensor is disposed on one side that is of the image sensor circuit board and that faces the lens assembly. The image sensor circuit board may be connected to the annular circuit board, or may be connected to the flexible substrate in the flexible mechanism. An imaging plane obtained after light passes through the lens assembly is located on a surface in which the image sensor is located. The image sensor obtains information about imaging light, the information is transmitted by using a transmission line on the image sensor circuit board, and the flexible mechanism performs outward signal output, to obtain imaging information. Therefore, after the lens assembly, the image sensor assembly, and the voice coil motor are assembled to form the camera module, the image sensor assembly can move with the moving assembly. In addition, image information obtained by the image sensor is transmitted outward by using the moving assembly.

According to a third aspect, this application further provides an electronic device. The electronic device includes a processor and the camera module according to the second aspect of this application. The processor is electrically connected to the image sensor assembly in the camera module, to obtain data of the image sensor.

The electronic device includes but is not limited to a mobile phone, a computer, a wearable device (for example, a phone flashlight or a head-mounted display device), or a security camera. The electronic device has a multi-angle and multi-direction image stabilization function.

REFERENCE NUMERALS

Figure 1:
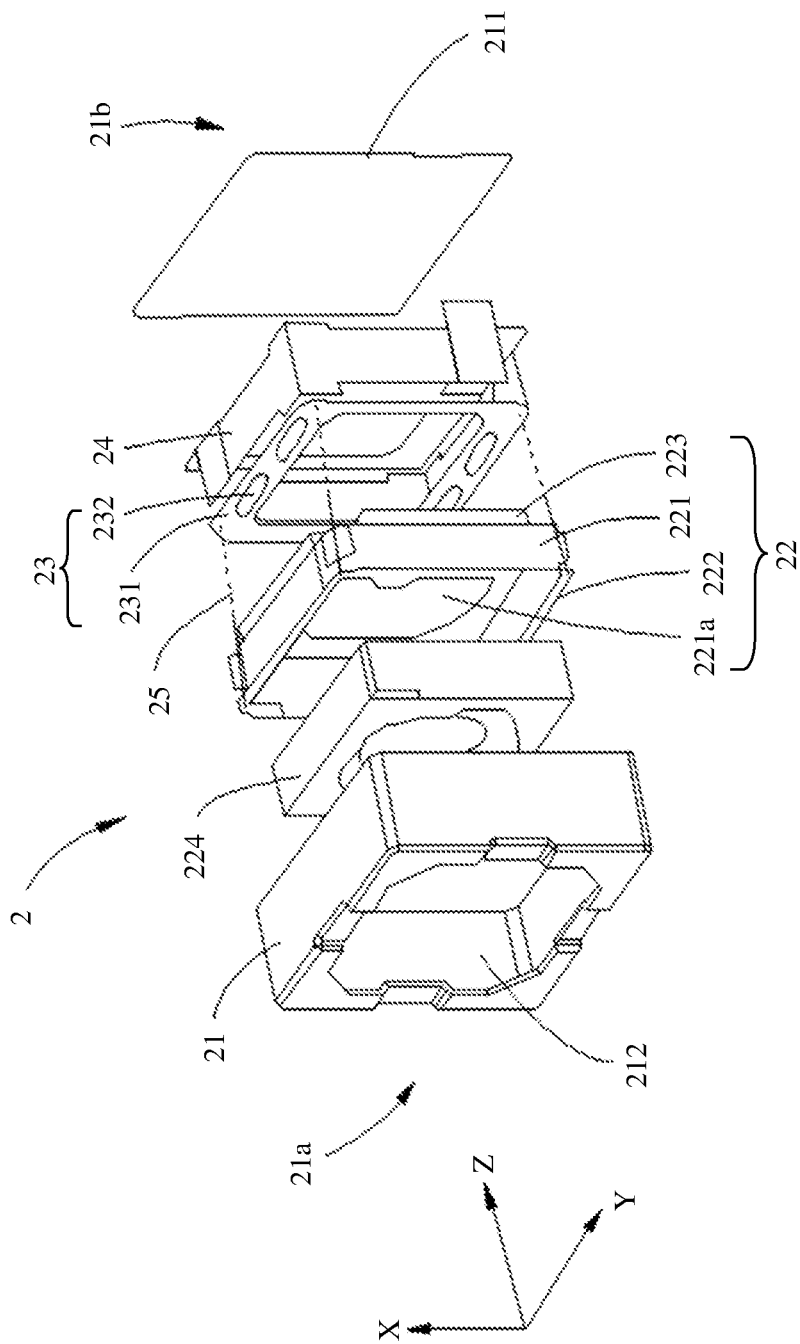
FIG. 1 is a schematic diagram of an exploded structure of a voice coil motor according to an embodiment of this application.

1—lens assembly; 2—voice coil motor; 21—motor housing; 21a—light incident side; 21b—backlight side; 211—cover plate;

212—incident hole; 22—fixed assembly; 221—annular fastening part; 221a—first through hole; 222—elastic element;

222a—annular spring; 223—magnetic element; 223a—annular magnet; 224—annular housing; 23—moving assembly;

231—annular circuit board; 231a—printed circuit board; 231b—second through hole; 231c—first side edge;

231d—second side edge; 231e—third side edge; 231f—fourth side edge; 232—coil; 233—mounting hole;

24—flexible mechanism; 241—flexible substrate; 242—flexible arm; 243—connection terminal; 25—suspension wire;

3—image sensor assembly; 31—image sensor circuit board; 32—image sensor; 100—camera module;

1100—electronic device; and 200—processor.

DESCRIPTION OF EMBODIMENTS

To make objectives, technical solutions, and advantages of this application clearer, the following further describes this application in detail with reference to the accompanying drawings.

A voice coil motor is an apparatus that converts electric energy into mechanical energy, and is configured to implement linear movement or movement of a limited pendulum angle. Currently, the voice coil motor is usually used in a camera apparatus of an electronic device to implement optical image stabilization of the camera apparatus. Optical image stabilization usually refers to that jittering of a device is detected, and a movement amount of a specific unit (for example, a lens, an image sensor, or a module including a lens and a sensor) is controlled based on a jitter amount to implement optical path compensation, so that an imaging optical path does not change due to an external jitter. An optical image stabilization method implemented by moving a lens has a simple implementation without moving any electrical signal. However, a change in the lens requires redesign of an entire image stabilization apparatus, and only image stabilization in a plane (a plane including an X axis and a Y axis) perpendicular to an optical path (also referred to as a Z axis) can be implemented. In addition, X/Y/Z-axis image stabilization may be implemented in an optical image stabilization method implemented by moving an image sensor. A change in the image sensor has a small impact on an image stabilization apparatus. However, this design solution needs to implement signal movement of the image sensor, which increases a module volume. In addition, an optical image stabilization method implemented by moving a module including a lens and an image sensor has a large image stabilization range and better performance. However, the image sensor and the lens need to be simultaneously moved, which requires a larger module volume. Therefore, optical image stabilization is implemented by moving an image sensor in most current image stabilization apparatuses. However, a moving assembly and a fixed assembly of an existing voice coil motor are usually disposed as a crossover structure. Consequently, when an image sensor assembly and a motor component are produced by different manufacturers, function verification cannot be independently performed on each module. Consequently, each component cannot be independently delivered, and a product delivery process is not decoupled.

To resolve the foregoing problems, embodiments of this application provide a voice coil motor. The voice coil motor may be used in an electronic product that has a shooting function, for example, a mobile phone, a tablet computer, a wearable electronic device, a drone, or a security surveillance camera.

Terms used in the following embodiments are merely intended to describe particular embodiments, but are not intended to limit this application. The terms "one", "a" and "this" of singular forms used in this specification and the appended claims of this application are also intended to include expressions such as "one or more", unless otherwise specified in the context clearly.

Referring to "one embodiment", "some embodiments", or the like that is described in this specification means that specific characteristics, structures, or features described with reference to one or more embodiments are included in the one or more embodiments of this application. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

FIG. 1 is a schematic diagram of an exploded structure of a voice coil motor according to an embodiment of this application. The voice coil motor may be used in a camera module. The camera module may include, for example, the voice coil motor and an image sensor assembly, and the image sensor assembly includes an image sensor circuit board and an image sensor disposed on the image sensor circuit board. The voice coil motor 2 in this embodiment of this application includes a motor housing 21, and a fixed assembly 22 and a moving assembly 23 that are disposed in the motor housing 21. An incident hole 212 is provided on a light incident side 21*a* of the motor housing 21, and a cover plate 211 is disposed on a backlight side 21*b* of the motor housing 21.

As shown in FIG. 1, the fixed assembly 22 and the moving assembly 23 are sequentially arranged in an optical axis direction (a Z-axis direction shown in FIG. 1, that is, a direction from the incident hole 212 of the motor housing 21 to the cover plate 211), and a specific gap, for example, a gap of 0.1 mm to 0.2 mm, exists between the fixed assembly 22 and the moving assembly 23, to reserve a movement space for the moving assembly 23. When the moving assembly 23 is connected to the fixed assembly 22, the moving assembly 23 may be suspended from the fixed assembly 22 by using suspension wires 25. The moving assembly 23 may easily perform slight movement around the fixed assembly 22 through a suspension connection, where the movement includes translation, rotation, inclination, or the like.

In some embodiments of this application, when the fixed assembly 22 is specifically disposed, the fixed assembly 22 may include an annular fastening part 221, a first through hole 221*a* is provided on a middle part of the annular fastening part 221, and the first through hole 221*a* is configured to accommodate a lens assembly. A projection of the annular fastening part 221 in a plane including an X-axis and a Y-axis (hereinafter referred to as an X/Y plane) may be, for example, of a homocentric square structure. In addition to the homocentric square structure, the projection of the annular fastening part 221 in the X/Y plane may alternatively be of a triangular annular structure, a regular pentagonal annular structure, a regular hexagonal annular structure, or the like. This is not limited herein in this application. When the projection of the annular fastening part 221 in the X/Y plane is of a homocentric square structure, four suspension wires 25 may be selected, and are respectively fastened to four vertex corners of the annular fastening part 221, to improve balance of the moving assembly 23.

To further increase a movement distance or rotation angle of the suspension wire 25, an elastic element 222 is disposed on one side that is of the annular fastening part 221 and that is away from the moving assembly 23, one end of the suspension wire 25 is connected to the elastic element 222, and the other end of the suspension wire 25 is connected to the moving assembly 23. For example, the elastic element 222 may be an annular spring disposed on a circumferential surface of the annular fastening part 221, or may be V-shaped springs or arc-shaped springs scattered on the annular fastening part 221.

In addition, a magnetic element 223 may be disposed on one side that is of the annular fastening part 221 and that is close to the moving assembly 23, and the magnetic element 223 provides a fixed magnetic field for the voice coil motor 2. In the embodiment shown in FIG. 1, the magnetic element 223 may be an annular magnet, a shape of the annular magnet matches a surface of an end part of the annular fastening part 221 and may also be of a homocentric square structure, and the annular magnet is fixedly mounted on the surface of the end part of the annular fastening part 221. A uniform magnetic field may be formed at the end part of the annular fastening part 221 in the circumferential direction by disposing the annular magnet. In addition to the annular magnet, the magnetic element 223 may alternatively include a plurality of magnets of a block structure, and the plurality of magnets are uniformly arranged on the surface of the end part of the annular fastening part 221.

In a possible embodiment of this application, when the moving assembly 23 is specifically disposed, the moving assembly 23 includes an annular circuit board 231, and a coil group including a plurality of coils 232 is disposed on one side that is of the annular circuit board 231 and that is close to the fixed assembly 22. In the Z-axis direction, the coil group is disposed opposite to the magnetic element 223. In this way, after the coils are energized, an acting force is generated between the coil group and the magnetic element 223 through electromagnetic induction, to drive the annular circuit board 231 to move along a Z axis or move or rotate in a plane (X/Y plane) perpendicular to the Z axis, or drive the annular circuit board 231 to tilt or offset. A projection of the annular circuit board 231 in the X/Y plane may also be of a homocentric square structure, so that the annular circuit board 231 is easily machined and assembled, and can match the annular fastening part 221, thereby facilitating alignment between the annular circuit board 231 and the annular fastening part 221.

When the coil 232 is disposed, the coil 232 may be integrated on a surface of the annular circuit board 231, or an independent coil 232 may be used. When the independent coil 232 is used, a placement position and a connection interface may be reserved on the surface of the annular circuit board 231 for the independent coil 232. A surface of one side that is of the coil 232 and that faces the magnetic element 223 may be flush with the surface of the annular circuit board 231, or may be protruded from the surface of the annular circuit board 231. A disposition shape and a disposition position of the coil 232 may be designed by simulating based on a to-be-implemented movement function.

In addition to the coil 232, a coil drive circuit may be further disposed on the annular circuit board 231, and the drive circuit is configured to control a size and a direction of a current in the coil 232. The magnetic element 223 interacts with the coil 232 to generate a thrust force, to drive the annular circuit board 231 carrying the coil 232 to move.

Figure 2:
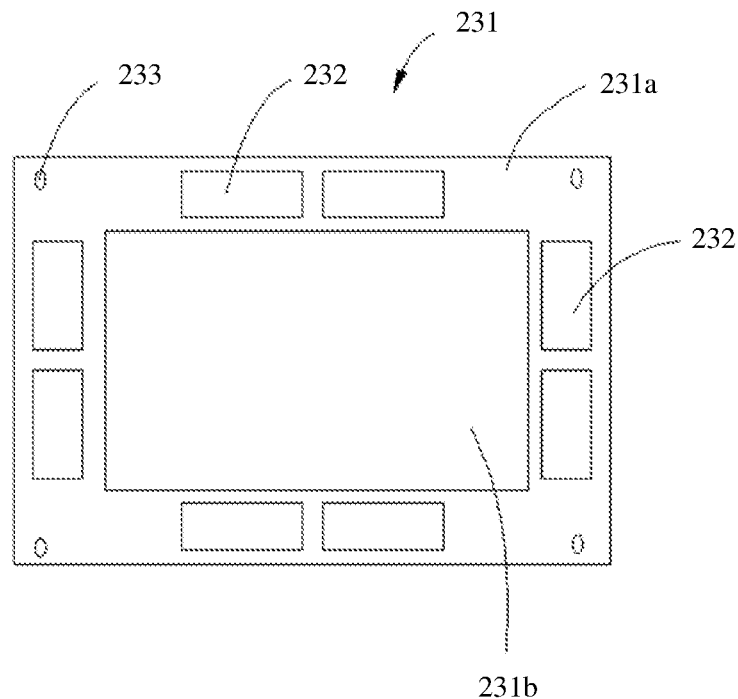
FIG. 2 is a schematic diagram of a structure of an annular circuit board according to an embodiment of this application.

FIG. 2 is a schematic diagram of a structure of the annular circuit board 231 according to an embodiment of this application. The annular circuit board 231 may be, for example, an annular printed circuit board or another substrate that can accommodate a circuit. In this embodiment, the annular circuit board 231 includes, for example, a printed circuit board 231*a* and the coils 232 disposed on the printed circuit board 231*a*. For example, the printed circuit board 231*a* may be of a homocentric square structure. In addition to the homocentric square structure, the printed circuit board 231*a* may alternatively be, for example, of a triangular annular structure, a regular pentagonal annular structure, a regular hexagonal annular structure, or the like. A second through hole 231*b* is provided on a middle part of the printed circuit board 231*a*, and two coils 232 are disposed on each side edge of the printed circuit board 231*a*. In addition, a mounting hole 233 configured to connect to the suspension wire is provided on each of four vertex corners of the printed circuit board 231*a*.

Figure 3A:
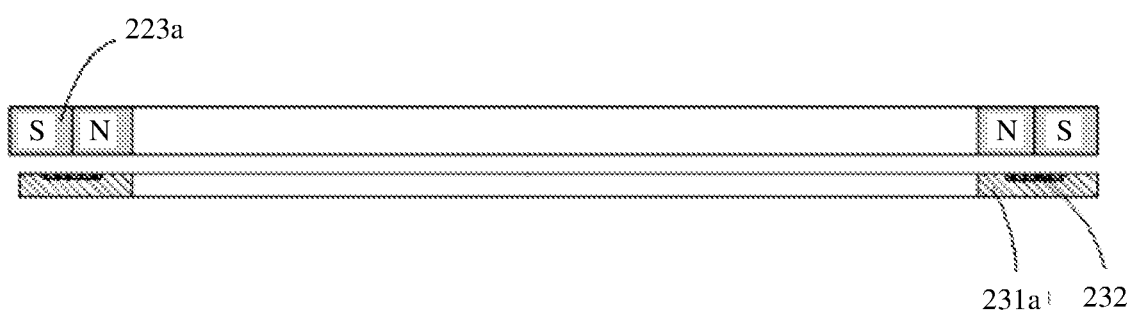
FIG. 3(a) shows a relative position relationship between an annular magnet and a coil and magnetic poles of the annular magnet according to an embodiment of this application.
Figure 3B:
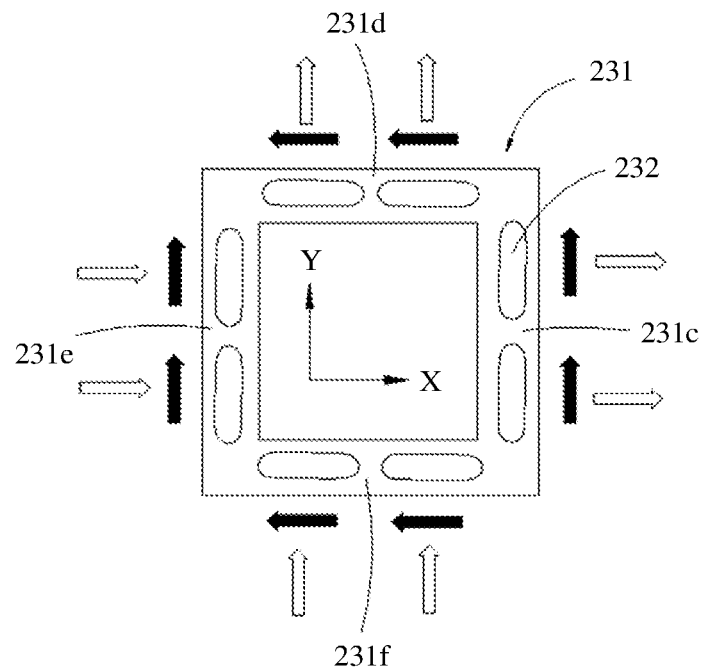
FIG. 3(b) shows an energization direction of a current in a coil when an acting force in an X-axis direction and an acting force in a Y-axis direction are generated.
Figure 3C:
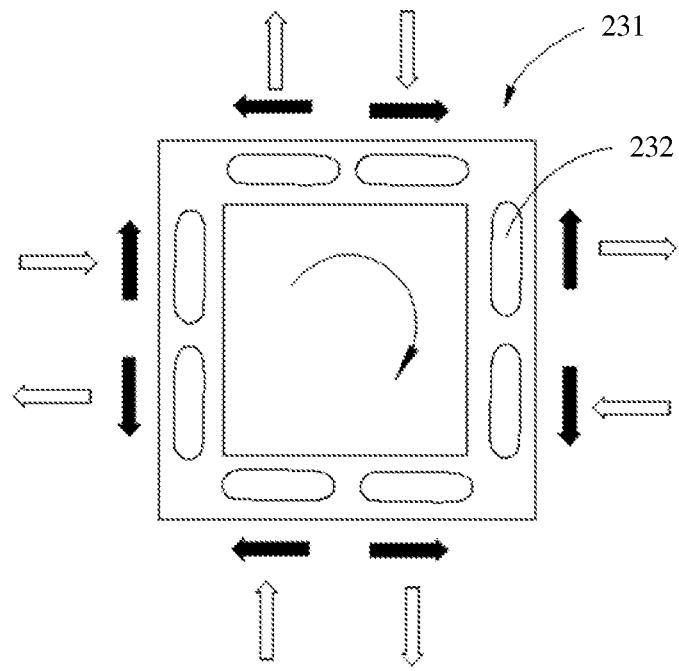
FIG. 3(c) shows an energization direction of a current in a coil when a rotation acting force is generated.

FIG. 3(*a*) to FIG. 3(*c*) show directions of forces on the coil 232 on the annular circuit board 231 shown in FIG. 2 under the action of the annular magnet 223*a* in several different energization cases. For ease of understanding, in the following embodiments of this application, that the annular circuit board 231 is of a homocentric square structure is used as an example to describe directions of forces on the annular circuit board 231 in different energization cases. FIG. 3(a) shows a relative position relationship between the annular magnet 223a and the coil 232 and magnetic poles of the annular magnet 223a. FIG. 3(b) shows an energization direction of a current in the coil 232 when an acting force in an X-axis direction and an acting force in a Y-axis direction are generated. FIG. 3(c) shows an energization direction of a current in the coil 232 when a rotation acting force is generated. In FIG. 3(a) and FIG. 3(b), a solid arrow represents a direction of a current, and a hollow arrow represents a direction of a force on the coil.

As shown in FIG. 3(a), for example, an inner part of the annular magnet 223a is an N-pole, and an outer part of the annular magnet 223a is an S-pole. As shown in FIG. 3(b), when a counterclockwise or clockwise current is separately applied to the coils 232 on two side edges (for example, a first side edge 231c and a third side edge 231e shown in the figure) parallel to the Y axis in the figure, an acting force in the X-axis direction may be generated, to drive the annular circuit board 231 to move in an X direction. Directions of the currents applied to the coils 232 on the first side edge 231c and the third side edge 231e may be the same or different, and sizes of the applied currents may be the same or different. The directions and the sizes of the currents in the coils 232 on the first side edge 231c and the third side edge 231e are controlled to control a force on the annular circuit board 231 in the X-axis direction, to drive the annular circuit board 231 to move in the X direction. When a counterclockwise or clockwise current is separately applied to the coils 232 on two side edges (for example, a second side edge 231d and a fourth side edge 231f shown in the figure) parallel to the X axis in the figure, an acting force in the Y-axis direction may be generated, to drive the annular circuit board 231 to move in a Y direction. Directions of the currents applied to the coils 232 on the second side edge 231d and the fourth side edge 231f may be the same or different, and sizes of the applied currents may be the same or different. The directions and the sizes of the currents in the coils 232 on the second side edge 231d and the fourth side edge 23 If are controlled to control a force on the annular circuit board in the Y-axis direction, to drive the annular circuit board to move in the Y direction. The direction and the size of the current in each coil 232 on the four side edges are controlled to control the annular circuit board 231 to move along the X axis and/or the Y axis, or rotate with the X axis or the Y axis as a rotation axis. As shown in FIG. 3(c), when currents of different directions are respectively applied to the two coils 232 on each side edge, a rotation acting force in the X/Y plane may be generated, so that the annular circuit board 231 can rotate counterclockwise or clockwise in the plane. In the energization cases shown in FIG. 3(b) and FIG. 3(c), sizes of energization currents are the same.

It may be understood that FIG. 3(b) and FIG. 3(c) are merely examples of force conditions of the coils. When an energization direction and a size of a current in the coil 232 are changed, the coil 232 may obtain different acting forces, thereby implementing multi-angle and multi-direction movement of the annular circuit board 231. This is conducive to implementing a multi-angle and multi-direction image stabilization function. In addition, when factors such as a disposition quantity and disposition positions of coils 232 on the annular circuit board 231 are changed, there may alternatively be another energization manner that changes the annular circuit board 231.

Still refer to FIG. 1. In the voice coil motor 2 in an embodiment of this application, the annular circuit board 231 may be further connected to a flexible mechanism 24, so that the annular circuit board 231 can be connected to an external circuit by using the flexible mechanism 24. A circuit is disposed in the flexible mechanism 24. To be specific, the flexible mechanism may include a flexible printed circuit to implement an electrical signal connection. In addition, the flexible mechanism 24 may be further used as a carrier of the annular circuit board 231, to play a role of mechanical support. Because the flexible mechanism 24 can be deformed to some extents when the annular circuit board 231 moves, the flexible mechanism 24 can cooperate with the annular circuit board 231 to move.

Figure 4A:
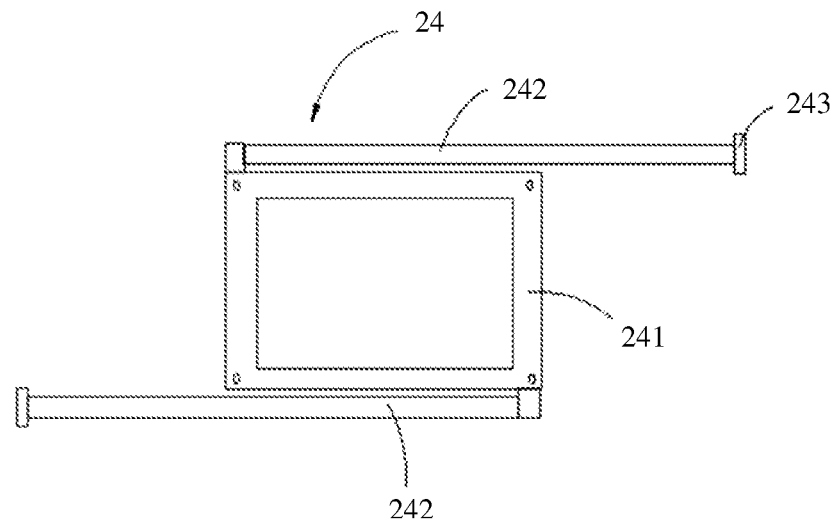
FIG. 4(a) is a schematic diagram of a structure of a flexible mechanism in an unassembled state according to an embodiment of this application.
Figure 4B:
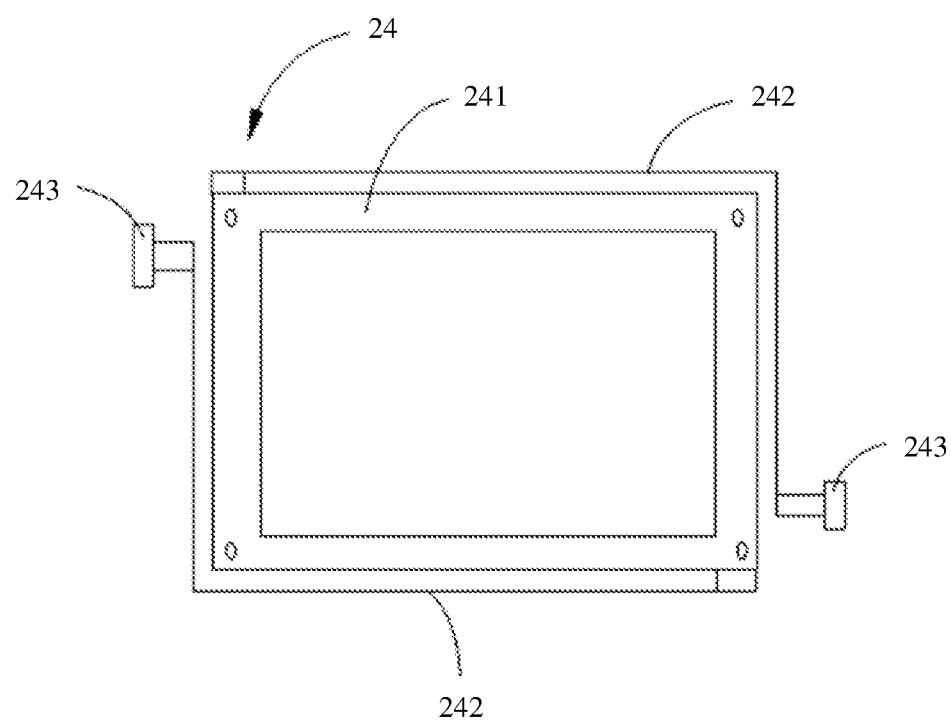
FIG. 4(b) is a schematic diagram of a structure of the flexible mechanism shown in FIG. 4(a) in an assembled state.

FIG. 4(a) and FIG. 4(b) are schematic diagrams of structures of a flexible mechanism according to an embodiment of this application. FIG. 4(a) is a schematic diagram of a structure of the flexible mechanism 24 in an unassembled state; and FIG. 4(b) is a schematic diagram of a structure of the flexible mechanism 24 in an assembled state.

As shown in FIG. 4(a), the flexible mechanism 24 may include a flexible substrate 241 configured to connect to the annular circuit board 231 and flexible arms 242 connected to the flexible substrate 241. The flexible substrate 241 in this embodiment may be of a homocentric square structure, the flexible arm 242 extends outward from an end part of the flexible substrate 241, and a wiring terminal 243 is disposed on a free end of the flexible arm 242.

As shown in FIG. 4(b), there are two flexible arms 242, and each of the flexible arms 242 surrounds the flexible substrate 241 in a circumferential direction from a vertex corner of the flexible substrate 241. A circuit is disposed on each of the flexible substrate 241 and the flexible arms 242, and after the flexible substrate 241 is assembled with the annular circuit board, the annular circuit board can be connected to the external circuit. In this application, the external circuit may be a processing circuit of an electronic device in which the voice coil motor is located. For example, when the voice coil motor is used in a mobile phone, the external circuit may be a processor in the mobile phone. In this application, the external circuit may control the voice coil motor by using the flexible mechanism 24 (for example, change a direction and a size of a current in the coil 232 to move the moving assembly 23), or may obtain data in the image sensor assembly by using the flexible mechanism 24.

Figure 5:
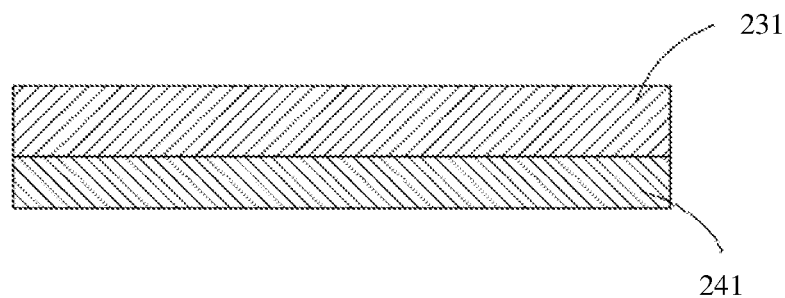
FIG. 5 is a schematic diagram of a cross-section structure obtained after an annular circuit board is attached to a flexible mechanism according to an embodiment of this application.

FIG. 5 is a schematic diagram of a cross-section structure obtained after the annular circuit board 231 is attached to the flexible mechanism. The flexible substrate 241 in the flexible mechanism is covered on the surface of the annular circuit board 231.

In addition, to enable the image sensor assembly to move with the annular circuit board 231, in an embodiment of this application, a connection part configured to fasten the image sensor assembly may be disposed on a surface of one side that is of the flexible substrate 241 and that is away from the annular circuit board 231, for example, a pad may be disposed. The pad is used to implement both a fixed connection and an electrical connection between the flexible substrate 241 and the image sensor assembly.

To improve a heat dissipation capability of the flexible mechanism 24, a thermally conductive layer is disposed on each of a surface of one side that is of the flexible substrate 241 and that is away from the annular circuit board 231 and surfaces of the flexible arms 242. A coefficient of thermal conductivity of the thermally conductive layer should be as high as possible, so that heat generated in an operation process of the annular circuit board 231 and the flexible mechanism 24 is dissipated as soon as possible. The thermally conductive layer may be, for example, a graphene thermally conductive layer. Because graphene has a high coefficient of thermal conductivity, a heat dissipation capability of the flexible arm can be effectively improved by using graphene as a material of the thermally conductive layer. In another possible embodiment, the thermally conductive layer may be a graphite thermally conductive layer, a copper layer, a silver layer, or the like.

It may be understood that, in addition to the foregoing structures, the voice coil motor may further include a positioning mechanism configured to mount the lens assembly. Still refer to FIG. 1. When the lens assembly is mounted on the voice coil motor 2, the positioning mechanism may be disposed on an inner wall of the annular fastening part 221 to mount the lens assembly. In this embodiment, the positioning mechanism is, for example, an annular housing 224, and a through hole part at a middle part of the annular housing 224 is configured to mount the lens assembly. When the annular housing 224 is assembled, a peripheral surface of the annular housing 224 may be connected to an inner surface of the annular fastening part 221 in a positioning manner. In addition, the magnetic element 223 may be further used as a positioning part of the annular housing 224 in the optical axis direction. In addition, a flange may be further disposed on an end part of the annular housing 224, to be disposed on an outer surface of the motor housing 21.

Figure 6:
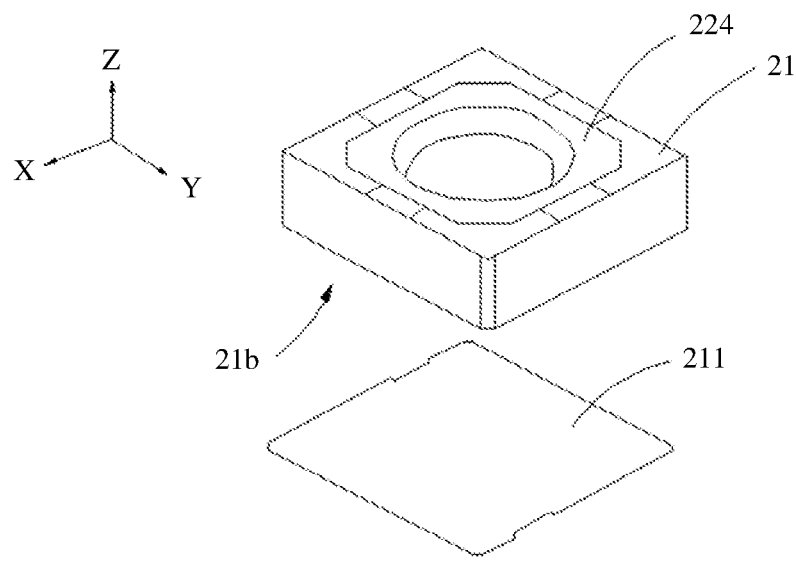
FIG. 6 is a schematic diagram of an assembly structure of a voice coil motor according to an embodiment of this application.

An assembly structure of a voice coil motor according to an embodiment of this application is shown in FIG. 6. The fixed assembly 22 and the moving assembly 23 (the fixed assembly 22 and the moving assembly 23 are not shown in FIG. 6, and for details, refer to FIG. 1) are assembled inside the motor housing 21. The annular housing 224 is fastened in the first through hole of the annular fastening part 221 (which is not shown in FIG. 6, and for details, refer to FIG. 1), and the cover plate 211 is located on the backlight side 21b of the motor housing 21.

Figure 7:
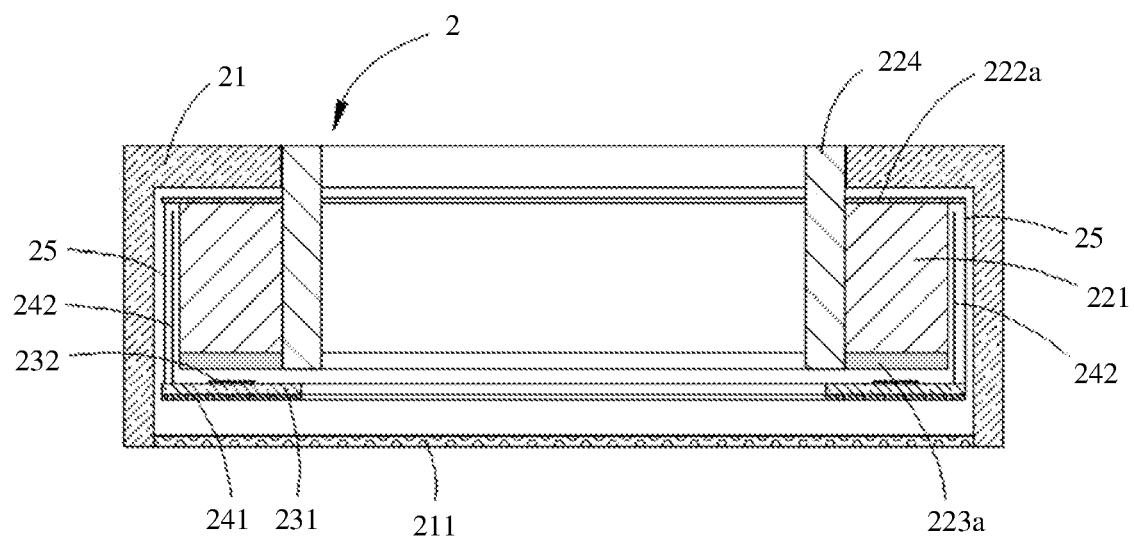
FIG. 7 is a schematic diagram of a cross-section structure of a voice coil motor according to an embodiment of this application.

In a possible embodiment of this application, a schematic diagram of a cross-section structure of the voice coil motor obtained after the components shown in FIG. 1 are assembled is shown in FIG. 7. For ease of understanding, a direction in which the annular fastening part 221 points to the cover plate 211 in FIG. 7 is defined as "from top to bottom". In the voice coil motor 2 in this embodiment, the annular fastening part 221 and the annular circuit board 231 that are assembled in the motor housing 21 are separated from each other and disposed opposite to each other. The annular magnet 223a on a lower surface of the annular fastening part 221 and the coil group that includes the plurality of coils 232 and that is on an upper surface of the annular circuit board 231 are disposed opposite to each other from top to bottom. The annular circuit board 231 is suspended on the annular spring 222a of the annular fastening part 221 by using the suspension wires 25. One end of each suspension wire 25 is connected to a vertex corner of the annular spring 222a, and the other end of the suspension wire 25 is connected to the annular circuit board 231. The flexible substrate 241 is covered on a lower surface of the annular circuit board 231, and the flexible arm 242 connected to the flexible substrate 241 is disposed between the annular fastening part 221 and the motor housing 21, and is connected to an external circuit interface disposed on the motor housing 21.

It can be learned that, in the voice coil motor 2 in this embodiment of this application, the moving assembly 23 and the fixed assembly 22 are sequentially disposed in the optical axis direction, the specific gap exists between the moving assembly 23 and the fixed assembly 22, and the moving assembly 23 and the fixed assembly 22 are connected by using the suspension wires 25. In addition, the connection part configured to assemble the image sensor assembly is reserved on the moving assembly 23. In this way, independent production and free assembly of the image sensor assembly and a motor component can be implemented. When the image sensor assembly and the motor component are produced by different manufacturers, function verification can be independently performed on each component. For example, because the voice coil motor has both the coils and the magnet, a manufacturer that produces the voice coil motor may perform independent function verification on the voice coil motor (for example, check whether movement of the moving assembly meets a predetermined indicator after energization). In this way, a delivery process of the image sensor assembly is independent of that of the motor component. This is more conducive to management and control of delivery quality and improvement of an overall yield of the camera module.

The following further describes an assembly process of the voice coil motor in this application with reference to FIG. 2, FIG. 4(a) and FIG. 4(b), and FIG. 7. An assembly process of a voice coil motor according to an embodiment of this application includes the following steps:

A structure of the annular circuit board 231 is shown in FIG. 2, and the annular circuit board 231 includes the printed circuit board 231a and the coils 232 disposed on the printed circuit board 231a; and a structure of the flexible mechanism is shown in FIG. 4(a) and FIG. 4(b), and the flexible mechanism includes the flexible substrate 241 and the flexible arms 242. Step (S1): Fasten the flexible substrate 241 to a surface of the printed circuit board 231a, and bend the flexible arms 242, so that the flexible arms 242 are bent in a circumferential direction of the flexible substrate 241.

Step (S2): Fasten the annular magnet 223a to a surface of one side of the annular fastening part 221.

Step (S3): Fasten the suspension wires 25 to the annular fastening part 221. For example, one suspension wire 25 may be separately fastened to vertex corners of the annular spring 222a of the annular fastening part 221, and the other end of the suspension wire 25 is fastened to the mounting hole 233 of the annular circuit board 231.

Step (S4): Dispose the connected annular fastening part 221 and annular circuit board 231 in the motor housing 21, and connect connection terminals 243 of the flexible arms 242 to circuit interfaces on the motor housing 21.

Step (S5): Mount the cover plate 211 on the motor housing 21 to obtain the voice coil motor 2 shown in FIG. 7.

It may be understood that, when the camera module is assembled and formed, components such as the lens assembly and the image sensor assembly need to be mounted in the voice coil motor. Therefore, in some possible embodiments of this application, the incident hole 212 of the motor housing 21 may be disposed coaxially with the first through hole 221a of the annular fastening part 221 and the second through hole 231b of the annular circuit board 231 to form a light transmission path.

Figure 8:
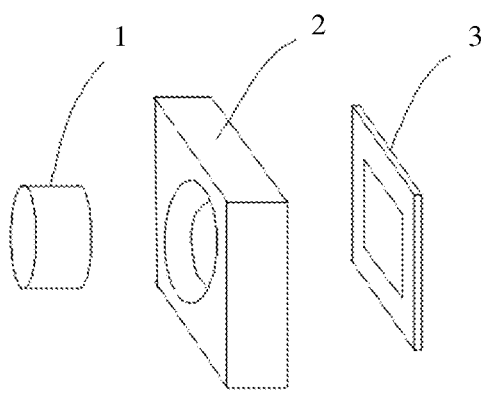
FIG. 8 is a schematic diagram of a structure of a camera module in a mobile phone camera according to an embodiment of this application.

Based on a same technical concept, this application further provides a camera module 100. For example, FIG. 8 is a schematic diagram of a structure of a camera module 100 in a camera of an electronic device. The camera module 100 includes a lens assembly 1, a voice coil motor 2, and an image sensor assembly 3. Light incident from one side of the lens assembly 1 passes through the lens assembly 1, and is transmitted to the image sensor assembly 3 for imaging. The image sensor assembly 3 converts obtained light information into an electrical signal and outputs the signal. When the electronic device jitters, the voice coil motor 2 drives the image sensor assembly 3 to move, so that a position of an imaging pixel of an imaging object on the image sensor assembly 3 remains unchanged. The voice coil motor 2 operates based on the Amp theorem. A fixed magnetic field is disposed in the voice coil motor 2. An acting force is generated for coils by energizing the coils, to drive a carrier that carries the coils and the image sensor assembly 3 to move, thereby implementing an image stabilization process. This process is actually implemented by controlling a direction and a size of a current in the coil.

Figure 9:
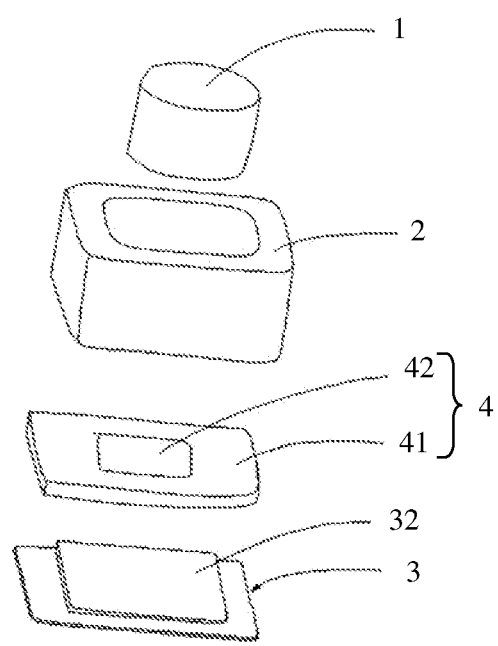
FIG. 9 is a schematic diagram of a structure of a camera module in another mobile phone camera according to an embodiment of this application.

In another implementation, in addition to the lens assembly 1, the voice coil motor 2, and the image sensor assembly 3, a structure of the camera module 100 may further include a filter module 4, and the structure of the camera module 100 is shown in FIG. 9. The filter module 4 includes a filter substrate 41 and a filter 42 disposed on the filter substrate. In this embodiment, the filter substrate 41 is fixedly connected to the image sensor assembly 3, and the filter 42 is disposed on a surface of an image sensor 32 in the image sensor assembly 3. In addition, the filter substrate 41 may alternatively be fixedly connected to the voice coil motor 2, for example, fastened to a fixed assembly or a motor housing on the voice coil motor 2.

Figure 10:
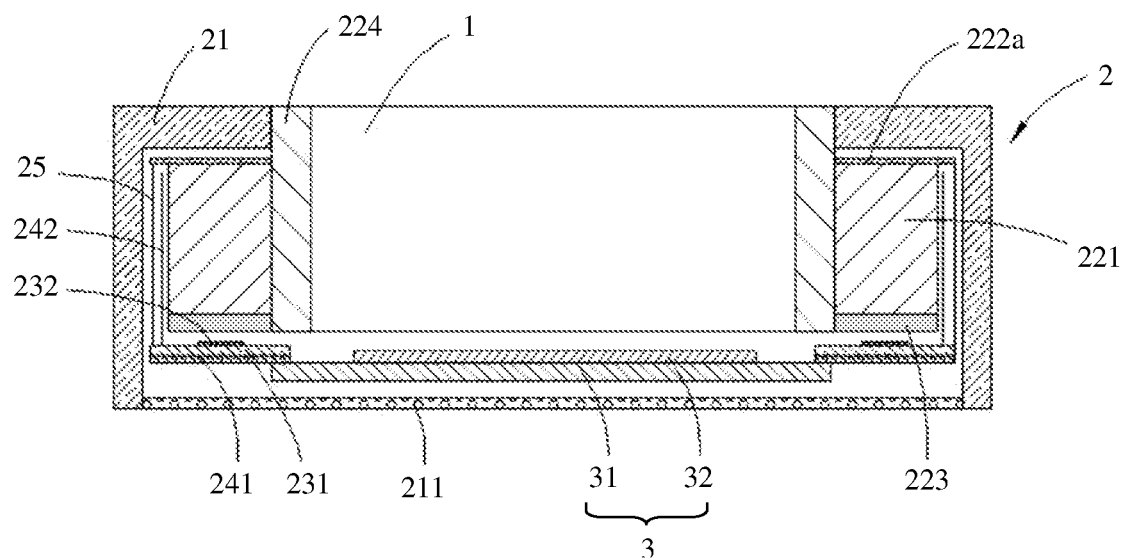
FIG. 10 is a schematic diagram of a cross-section structure of a camera module according to an embodiment of this application.

FIG. 10 is a schematic diagram of a cross-section structure of the camera module 100 according to an embodiment of this application. As shown in FIG. 10, for ease of understanding, a direction in which an annular fastening part 221 points to a cover plate 211 is defined as "from top to bottom".

In the camera module 100, the lens assembly 1 is assembled in a first through hole 221a of the annular fastening part 221, where the lens assembly 1 is first fastened in an annular housing 224, and the annular housing 224 is disposed in the first through hole 221a of the annular fastening part 221 together with the lens assembly 1. An annular spring 222a is disposed on an upper part of the annular fastening part 221, and an annular magnet 223a is disposed on a lower part of the annular fastening part 221.

An annular circuit board 231 is disposed below the annular fastening part 221, and is suspended on the annular spring 222a by using suspension wires 25 located between the annular fastening part 221 and the motor housing 21. A plurality of coils 232 are disposed on an upper surface of the annular circuit board 231, and the coils 232 are disposed opposite to the annular magnet 223a. A flexible substrate 241 is disposed on a lower surface of the annular circuit board 231, flexible arms 242 integrally connected to the flexible substrate 241 are disposed around a periphery of the flexible substrate 241, the flexible arms 242 are located between the suspension wires 25 and the motor housing 21, and connection terminals of the flexible arms 242 are connected to the motor housing 21. In addition, a reserved pad that serves as a connection part is disposed on a surface of one side that is of the flexible substrate 241 and that faces the cover plate.

In this embodiment, the image sensor assembly 3 includes an image sensor circuit board 31 and an image sensor 32 disposed on a surface of one side that is of the image sensor circuit board 31 and that is close to the lens assembly 1. A pad or a weld leg is also disposed on a surface of one side that is of the image sensor circuit board 31 and that faces the flexible substrate 241, to fixedly connect the image sensor circuit board 31 and the flexible substrate 241. The image sensor circuit board 31 is fixedly and electrically connected to the flexible substrate 241 in a welding manner.

After the lens assembly 1, the voice coil motor 2, and the image sensor assembly 3 are assembled into the camera module 100, an imaging plane obtained after light passes through the lens assembly 1 is located on a surface in which the image sensor 32 is located. The image sensor 32 obtains information about imaging light, the information is transmitted by using a transmission line on the image sensor circuit board 31, the information is then transmitted by using the flexible substrate 241, and then the flexible arms 242 perform signal output, to obtain imaging information. The image sensor assembly 3 may move with the annular circuit board 231 by using the flexible substrate 241, and transmit, by using the flexible mechanism 24, image information obtained by the image sensor 32 to the outside.

When the camera module 100 of this structure is assembled, the image sensor assembly 3 may be directly fastened to the flexible substrate 241. When the image sensor assembly 3 and the voice coil motor 2 are produced by different manufacturers, function verification can be independently performed on each component. This is more conducive to management and control of delivery quality and improvement of an overall yield of the camera module 100.

Figure 11:
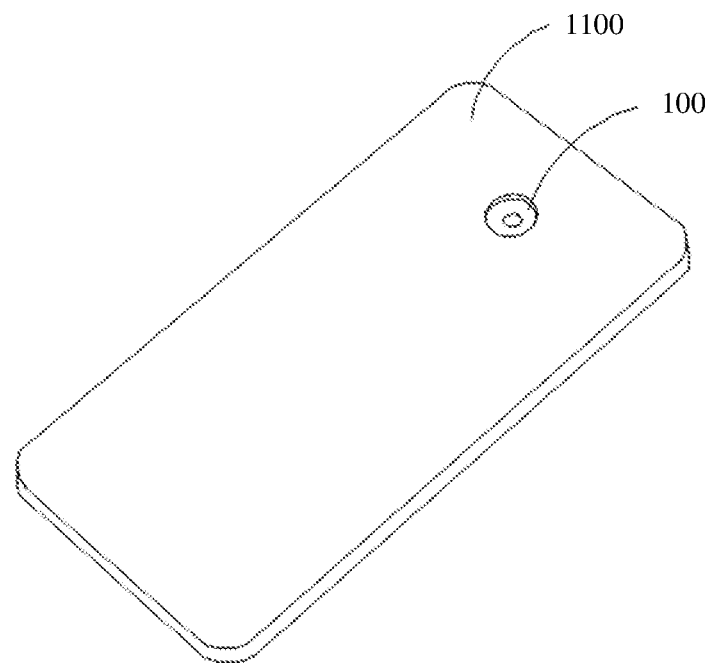
FIG. 11 is a schematic diagram of a structure of an electronic device according to an embodiment of this application.

Based on a same inventive concept, this application further provides an electronic device. The electronic device includes but is not limited to a mobile phone, a computer, a wearable device (for example, a phone flashlight or a head-mounted display device), or a security camera. FIG. 11 is a schematic diagram of a structure of an electronic device according to an embodiment of this application. The electronic device 1100 may be any electronic device that uses a camera module, for example, a mobile phone, a tablet computer, or a television. As shown in FIG. 11, the electronic device 1100 includes a processor and a camera module 100. It may be understood that FIG. 11 is merely an example for description, and a quantity of camera modules 100 may be one, two, three, four, or the like. A disposition quantity and disposition positions of camera modules 100 are not specifically limited herein.

Figure 12:
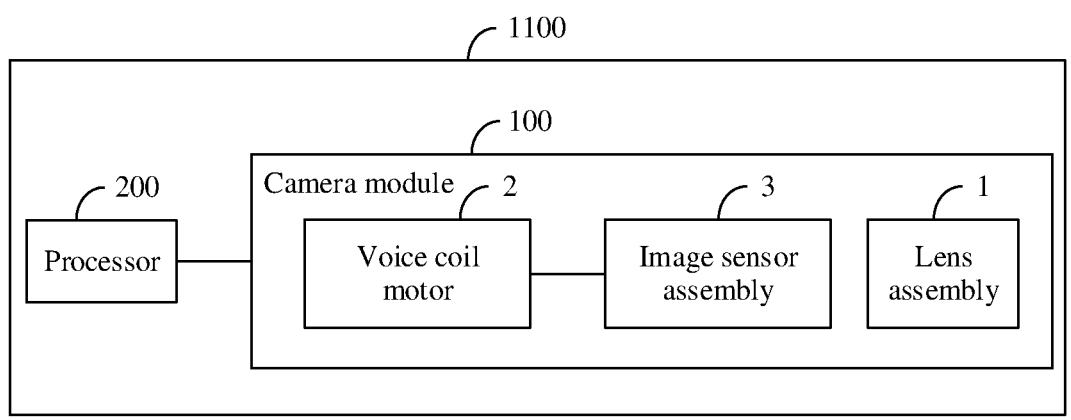
FIG. 12 is a schematic diagram of an electrical connection structure between a processor and an image sensor assembly according to an embodiment of this application.

Refer to FIG. 12 and FIG. 10. The processor 200 is electrically connected to the image sensor assembly 3 in the camera module 100, to obtain data of the image sensor 32. As shown in FIG. 12, the processor 200 may control the voice coil motor 2 by using the flexible mechanism 24, and the processor 200 may further implement a signal connection to the image sensor assembly 3 by using the flexible mechanism 24, to obtain the data of the image sensor 32.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A voice coil motor, used in a camera module, wherein the camera module comprises the voice coil motor and an image sensor assembly, and the image sensor assembly comprises an image sensor circuit board and an image sensor disposed on the image sensor circuit board; and the voice coil motor comprises:
    a motor housing, wherein the motor housing has a light incident side and a backlight side, and an incident hole is provided on the light incident side; and a fixed assembly and a moving assembly that are disposed in the motor housing, wherein the fixed assembly and the moving assembly are sequentially disposed in a direction from the light incident side to the backlight side at an interval, and the moving assembly is connected to the fixed assembly by using suspension wires;

the fixed assembly comprises an annular fastening part, wherein a magnetic element is disposed on one side that is of the annular fastening part and that is close to the moving assembly;

the moving assembly comprises an annular circuit board defining a surface, wherein the annular circuit board connects to an external circuit by using a flexible-mechanism including a flexible substrate disposed in contact with the surface of the annular circuit board, a coil group is disposed on one side that is of the annular circuit board and that is close to the annular fastening part, and an acting force generated between the coil group and the magnetic element after the coil group is energized drives the annular circuit board to move; and one side that is of the moving assembly and that faces the backlight side is configured to connect to the image sensor circuit board, wherein when the moving assembly operates, the image sensor assembly is driven to move.

2. The voice coil motor according to claim 1, wherein a quantity of suspension wires is greater than or equal to three, and the suspension wires is scattered in a circumferential direction of the annular circuit board.

3. The voice coil motor according to claim 1, wherein an elastic element is disposed on one side that is of the annular fastening part and that is away from the moving assembly, one end of the suspension wire is connected to the elastic element, and the other end of the suspension wire is connected to the annular circuit board.

4. The voice coil motor according to claim 1, wherein the coil group comprises a plurality of coils, and the plurality of coils are scattered on a surface of one side of the annular circuit board.

5. The voice coil motor according to claim 1, wherein the magnetic element is an annular magnet matching a surface of the annular fastening part; or the magnetic element comprises a plurality of magnet blocks, wherein the plurality of magnet blocks are disposed on a surface of the annular fastening part in a circumferential direction.

6. The voice coil motor according to claim 1, wherein a connection part is disposed on the side that is of the moving assembly and that faces the backlight side, the connection part is configured to connect to the image sensor circuit board; and the connection part comprises a pad and/or a conductive plug connector.

7. The voice coil motor according to claim 6, wherein the flexible mechanism further comprises flexible arms connected to the flexible substrate, the flexible substrate is attached to the surface that is of the annular circuit board and that is close to the backlight side, and a free end of the flexible arm is fastened to the annular fastening part or the motor housing.

8. The voice coil motor according to claim 7, wherein the connection part is disposed on a surface that is of a flexible substrate and that faces the backlight side.

9. The voice coil motor according to claim 7, wherein a thermally conductive layer is disposed on each of a surface of one side that is of the flexible substrate and that is away from the annular circuit board and surfaces of the flexible arms.

10. A camera module, comprising a lens assembly, an image sensor assembly, and a voice coil motor, wherein the image sensor assembly comprises an image sensor circuit board and an image sensor disposed on the image sensor circuit board;

the voice coil motor comprises:

a motor housing, wherein the motor housing has a light incident side and a backlight side, and an incident hole is provided on the light incident side; and a fixed assembly and a moving assembly that are disposed in the motor housing, wherein the fixed assembly and the moving assembly are sequentially disposed in a direction from the light incident side to the backlight side at an interval, and the moving assembly is connected to the fixed assembly by using suspension wires;

the fixed assembly comprises an annular fastening part, wherein a magnetic element is disposed on one side that is of the annular fastening part and that is close to the moving assembly;

the moving assembly comprises an annular circuit board defining a surface, wherein the annular circuit board connects to an external circuit by using a flexible mechanism including a flexible substrate disposed in contact with the surface of the annular circuit board, a coil group is disposed on one side that is of the annular circuit board and that is close to the annular fastening part, and an acting force generated between the coil group and the magnetic element after the coil group is energized drives the annular circuit board to move; and one side that is of the moving assembly and that faces the backlight side is configured to connect to the image sensor circuit board, wherein when the moving assembly operates, the image sensor assembly is driven to move;

the lens assembly is disposed in a first through hole of the annular fastening part; and the image sensor assembly is connected to the moving assembly, and is configured to block a second through hole of the annular circuit board, to obtain light that passes through the lens assembly.

11. The camera module according to claim 10, wherein a quantity of suspension wires is greater than or equal to three, and the suspension wires is scattered in a circumferential direction of the annular circuit board.

12. The camera module according to claim 10, wherein an elastic element is disposed on one side that is of the annular fastening part and that is away from the moving assembly, one end of the suspension wire is connected to the elastic element, and the other end of the suspension wire is connected to the annular circuit board.

13. The camera module according to claim 10, wherein the coil group comprises a plurality of coils, and the plurality of coils are scattered on a surface of one side of the annular circuit board.

14. The camera module according to claim 10, wherein the magnetic element is an annular magnet matching a surface of the annular fastening part; or the magnetic element comprises a plurality of magnet blocks, wherein the plurality of magnet blocks are disposed on a surface of the annular fastening part in a circumferential direction.

15. The camera module according to claim 10, wherein a connection part is disposed on the side that is of the moving assembly and that faces the backlight side, the connection part is configured to connect to the image sensor circuit board; and the connection part comprises a pad and/or a conductive plug connector.

16. The camera module according to claim 10, wherein the image sensor circuit board is connected to the annular circuit board, or the flexible substrate in the flexible mechanism.

17. The electronic device according to claim 10, wherein a quantity of suspension wires is greater than or equal to three, and the suspension wires is scattered in a circumferential direction of the annular circuit board.

18. The electronic device according to claim 10, wherein an elastic element is disposed on one side that is of the annular fastening part and that is away from the moving assembly, one end of the suspension wire is connected to the elastic element, and the other end of the suspension wire is connected to the annular circuit board.

19. The electronic device according to claim 10, wherein the coil group comprises a plurality of coils, and the plurality of coils are scattered on a surface of one side of the annular circuit board.

20. An electronic device, comprising a processor and a camera module, wherein the camera module comprises a lens assembly, an image sensor assembly, and a voice coil motor, wherein the image sensor assembly comprises an image sensor circuit board and an image sensor disposed on the image sensor circuit board;

the voice coil motor comprises:

a motor housing, wherein the motor housing has a light incident side and a backlight side, and an incident hole is provided on the light incident side; and a fixed assembly and a moving assembly that are disposed in the motor housing, wherein the fixed assembly and the moving assembly are sequentially disposed in a direction from the light incident side to the backlight side at an interval, and the moving assembly is connected to the fixed assembly by using suspension wires;

the fixed assembly comprises an annular fastening part, wherein a magnetic element is disposed on one side that is of the annular fastening part and that is close to the moving assembly;

the moving assembly comprises an annular circuit board defining a surface, wherein the annular circuit board connects to an external circuit by using a flexible mechanism including a flexible substrate disposed in contact with the surface of the annular circuit board, a coil group is disposed on one side that is of the annular circuit board and that is close to the annular fastening part, and an acting force generated between the coil group and the magnetic element after the coil group is energized drives the annular circuit board to move; and one side that is of the moving assembly and that faces the backlight side is configured to connect to the image sensor circuit board, wherein when the moving assembly operates, the image sensor assembly is driven to move;

the lens assembly is disposed in a first through hole of the annular fastening part; and the image sensor assembly is connected to the moving assembly, and is configured to block a second through hole of the annular circuit board, to obtain light that passes through the lens assembly;

the processor is electrically connected to the image sensor assembly, to obtain data of the image sensor.

* * * * *